United States Patent
Shimizu et al.

(10) Patent No.: US 6,861,837 B1
(45) Date of Patent: Mar. 1, 2005

(54) ROTATION ANGLE DETECTOR

(75) Inventors: Masaru Shimizu, Yawata (JP); Koji Oike, Otokuni-gun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/862,563

(22) Filed: Jun. 7, 2004

(30) Foreign Application Priority Data

Jun. 16, 2003  (JP) ........................................ 2003-170291

(51) Int. Cl.$^7$ .............................................. G01B 7/30
(52) U.S. Cl. ............................... 324/207.25; 33/1 PT
(58) Field of Search ..................... 324/207.11–207.18, 324/207.2, 207.21–207.26, 161, 173; 33/1 PT

(56) References Cited

U.S. PATENT DOCUMENTS

| | | | |
|---|---|---|---|
| 5,065,324 A | 11/1991 | Oshita et al. | |
| 5,446,966 A | 9/1995 | Ishizaki | |
| 5,930,905 A | 8/1999 | Zabler et al. | |
| 6,341,426 B1 | 1/2002 | Okumura | |
| 6,380,536 B1 | 4/2002 | Inoue et al. | |
| 6,507,188 B1 | 1/2003 | Dilger et al. | |
| 6,550,150 B1 | 4/2003 | Skirai et al. | |
| 6,604,293 B2 | 8/2003 | Hamada | |
| 6,622,388 B2 | 9/2003 | Meyer et al. | |
| 6,671,972 B2 | 1/2004 | Mitterreiter et al. | |
| 6,804,888 B2 * | 10/2004 | Nishikawa et al. | ......... 33/1 PT |

FOREIGN PATENT DOCUMENTS

| | | |
|---|---|---|
| JP | 63-284064 | 11/1988 |
| JP | 2002-213910 A | 7/2002 |

* cited by examiner

*Primary Examiner*—Bot LeDynh
(74) *Attorney, Agent, or Firm*—RatnerPrestia

(57) ABSTRACT

A rotation angle detector is simple in structure and is capable of angle detection with a high resolution. First and second detecting units detect rotations of first and second detecting members rotating in association with a rotating member as detection signals in which predetermined waveforms continue. A control unit connected with the first and second detecting units detects a difference between the waveforms output from first and second detecting units as a gradually increasing detection signal and detects a rotation angle of the rotating member from two signals: the gradually increasing detection signal and the waveform output from the first detecting unit.

4 Claims, 4 Drawing Sheets

Rotation is abbreviated to as R in Fig.2A-2C.
Neutral Point is abbreviated to NP in Fig.2A-2C.

ROTATION ANGLE DETECTOR

FIELD OF THE INVENTION

The present invention relates to a rotation angle detector for detecting a rotation angle of, for example, a steering wheel on a vehicle.

BACKGROUND OF THE INVENTION

While higher performance vehicles have come into being in recent years, there have been developed various apparatuses for detecting the rotation angle of the steering wheel (hereinafter called SWH) with use of rotation angle detectors (hereinafter called RAD) for performing various types of control.

One of such conventional rotation angle detectors will be described with reference to FIG. 4, FIG. 5A and FIG. 5B.

FIG. 4 is a perspective view of a main portion of the conventional RAD and FIG. 5A and FIG. 5B are voltage waveforms obtained from the RAD. Rotating member 1 in a disk form has, in its center, engagement portion 1A engaging a shaft (not shown) of an SWH inserted therein and opening portion 1C allowing the shaft of the SWH to pass therethrough. On the circumference of rotating member 1, there are provided a plurality of through holes 1B at a predetermined pitch. Across through hole 1B formed in rotating member 1, there are arranged photo-interrupters 2, 3, each made up of a light emitting element and a photo sensing element opposing each other. Further, the photo-interrupters are held by holding member 4 in predetermined positions slightly offset with respect to through hole 1B, so that detection signals output therefrom while rotating member 1 rotates may have a predetermined phase difference therebetween.

Further, there are disposed wiring board 5 with a plurality of wiring patterns (not shown) formed on both sides thereof and a control unit (not shown) made of a microcomputer and the like. By having photo-interrupters 2, 3 connected to the control unit, the RAD is constructed.

In the described configuration, rotating member 1 is rotated according as the SWH is rotated and, thereby, admission of light and cut-out of light are repeated.

As a result, detection signals in which periodical rectangular waveforms with a phase difference therebetween, as shown in FIGS. 5A and 5B, continue are output from photo-interrupters 2, 3 to the control unit.

The rotation angle of rotating member 1 is detected by counting the number of waveforms in either of the detection signals from photo-interrupters 2, 3. The rotating direction can also be detected as follows. When, for example, the waveform of photo-interrupter 2 shown in FIG. 5A is lagging behind the waveform of photo-interrupter 3 shown in FIG. 5B, it is determined that the rotation is in a clockwise direction, and, when in reverse the waveform of photo-interrupter 2 is output faster than the waveform of photo-interrupter 3, it is determined that the rotation is in a counterclockwise direction. An example of RAD having the described configuration is disclosed in U.S. Pat. No. 6,380,536.

At this time, if the pitch of through hole 1B of rotating member 1 is set at 6°, the width of the hole set at 3°, and the phase difference between photo-interrupters 2, 3 set at ¼ period, waveforms of FIG. 5A and FIG. 5B each become a waveform having a period of 6° and they become ¼ period shifted from each other. Thus, a RAD capable of detecting a rotation angle down to as small an increment as 6°/4=1.5°, i.e., that having a resolution of 1.5°, can be structured.

The described conventional RAD detects a rotation angle with use of two sets of photo-interrupters 2, 3, as well as rotating member 1 provided with a plurality of through holes 1B formed therein. Therefore, there arises such a problem that layout and machining of the components become complicated and costly. Further, since there are limits in reducing the pitch distance between through holes 1B and the width of the hole, it is difficult to perform angle detection with a high resolution.

The present invention addresses the above mentioned problems in the prior art and, accordingly, it aims at the provision of a RAD capable of angle detection at a high resolution with a simple structure.

SUMMARY OF THE INVENTION

The present invention provides a rotation angle detector, in which first and second detecting units detect rotations of first and second detecting members rotating in association with a rotating member as detection signals in which predetermined waveforms continue, a control unit connected with the first and second detecting units detects a difference between the waveforms output from the first and second detecting units as a gradually increasing or decreasing signal and, thereupon, detects a rotation angle of the rotating member from two detection signals: (1) the gradually increasing or decreasing detection signal; and (2) one of the waveforms output from the first and second detecting units.

DESCRIPTION OF THE PREFERRED EMBODIMENTS

Figure 1:
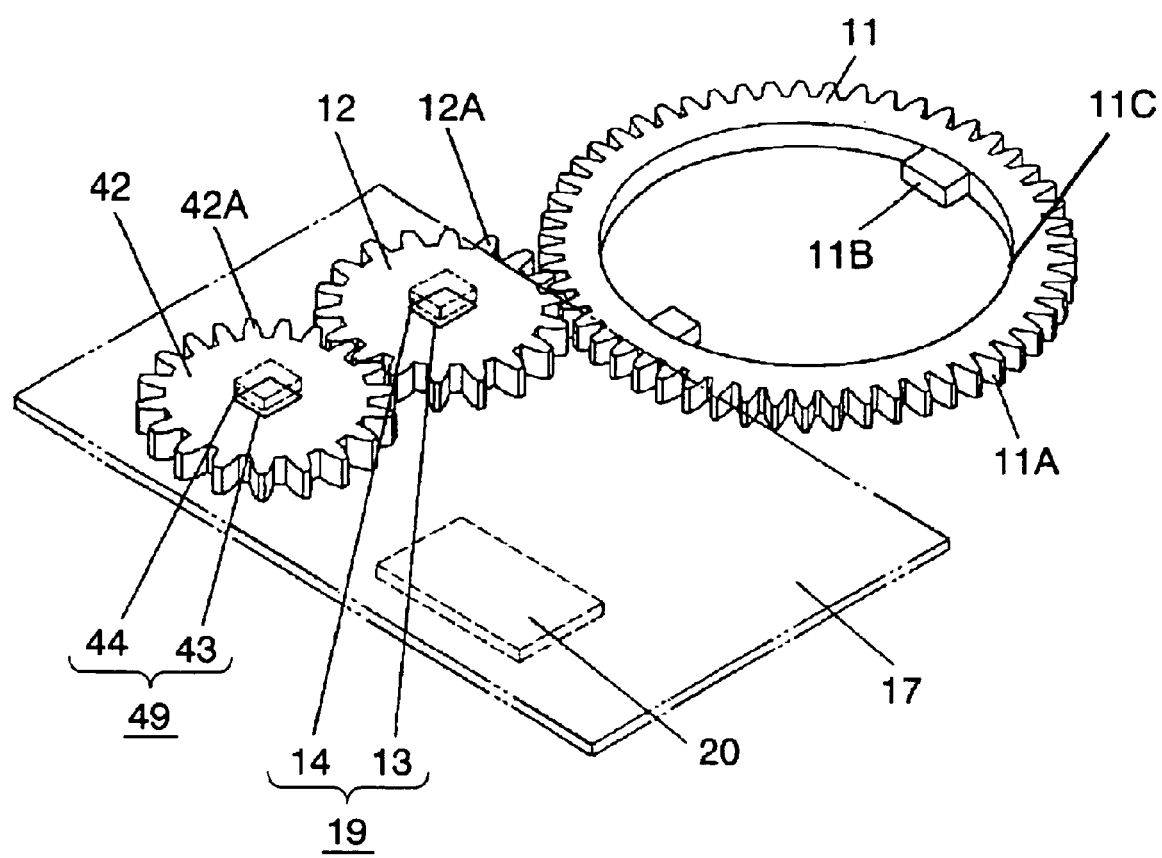
FIG. 1 is a perspective view of an important portion of a rotation angle detector of a first embodiment of the present invention.

An embodiment of the present invention will be described with reference to FIG. 1–FIG. 3. It is to be noted that the drawings are all schematic drawings and they do not show dimensions and positions of the components exactly. As a magnetism detecting element, a magnetoresistance device such as that of InSb is preferably used. Further, as a magnet, while any permanent magnet can be used, a samarium magnet, neodymium magnet, or ferrite magnet is preferably used.

In the indication of a rotation angle, a positive rotation is that in a clockwise direction and a negative rotation is that in a counterclockwise direction.

(Exemplary Embodiment)

Rotating member 11 has spur gear portion 11A on its circumferential side and has, in its interior, an opening 11C for allowing the shaft of an SWH to be passed therethrough and engagement portion 11B for allowing the shaft of SWH to be engaged therewith.

First detecting member 12 has, on its circumferential side, spur gear portion 12A in meshing engagement with spur gear portion 11A of rotating member 11. In the center of first detecting member 12, there is mounted magnet 13 by insert molding or the like.

Second detecting member 42 has, on its circumferential side, spur gear portion 42A in meshing engagement with spur gear portion 12A of first detecting member 12. In the center of second detecting member 42, there is mounted magnet 43 by insert molding or the like.

Second detecting member 42 is formed to be larger in diameter than first detecting member 12 and number of gear teeth of spur gear portion 42A is made greater than that of spur gear portion 12A.

The numbers of the gear teeth of first detecting member 12 and second detecting member 42 are set at such numbers of teeth that the detecting members return to their original meshing position after a predetermined angle of rotation made by rotating member 11, i.e., they return to their original meshing position after, for example, two rotations of rotating member 11 in a counterclockwise direction and after two rotations of the same in a clockwise direction, from the neutral position.

There is disposed wiring board 17, having a plurality of wiring patterns (not shown) formed on both sides thereof, substantially parallel to first detecting member 12 and second detecting member 42.

Further, there is mounted magnetism detecting element 14 made for example of an AMR element (anisotropic magnetoresistance element) on the surface of wiring board 17 opposite to first detecting member 12. Thus, first detecting unit 19 is constituted of magnet 13 and magnetism detecting element 14 opposing each other.

In like manner, second detecting unit 49 is constituted of magnet 43 and magnetism detecting element 44 opposing each other.

Control unit 20 formed of a microcomputer and the like is connected with magnetism detecting element 14 of first detecting unit 19 and magnetism detecting element 44 of second detecting unit 49. Further, control unit 20 is connected to electronic circuitry (not shown) on board the vehicle body. Thus, the RAD is constructed.

In the described configuration, when the SWH is rotated, rotating member 11 is rotated accordingly and, first detecting member 12, whose spur gear portion 12A is in meshing engagement with spur gear portion 11A on the circumferential side of rotating member 11, is also rotated.

Figure 2A:
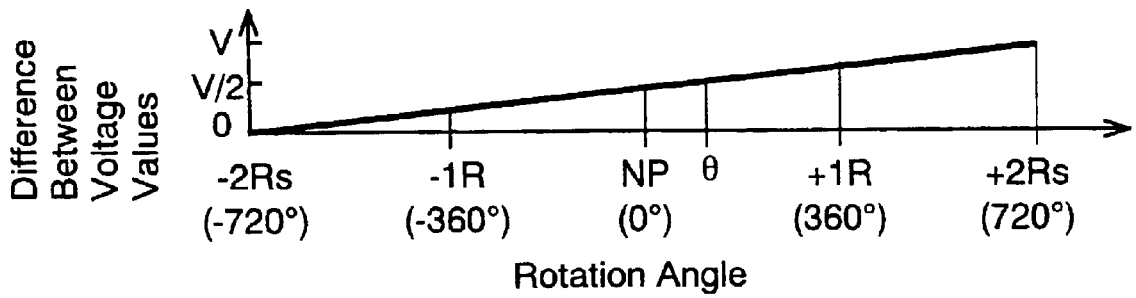
FIG. 2A–FIG. 2C are voltage waveform diagrams output from the rotation angle detector of the embodiment of the present invention.

According as first detecting member 12 is rotated, the magnetic field around magnet 13 mounted in the center of the same varies. The variation in the magnetic field is detected by magnetism detecting element 14, and thereby a detection signal, in which predetermined increasing and decreasing waveforms continue as shown in the voltage waveform diagram of FIG. 2C is output from magnetism detecting element 14 of first detecting unit 19 to control unit 20.

At this time, if, for example, the number of teeth of first detecting member 12 is set at one-third the number of teeth of rotating member 11 and magnetism detecting element 14 is adapted only to detect the magnetic field strength (namely, to detect the magnetic field strength every 180° rotation of detecting member 12), then detecting member 12 makes three rotations while rotating member 11 makes one rotation and magnetism detecting element 14 detects two changes in field strength for one rotation of first detecting member 12. As a result, six voltage waveforms are successively output as the detection signal.

More specifically, for every 60° rotation of rotating member 11, one predetermined voltage waveform increasing from voltage value zero to voltage value V and then decreasing is output from magnetism detecting element 14 to control unit 20 as the detection signal.

Likewise, according as first detecting member 12 is rotated, second detecting member 42 rotates and the magnetic field around magnet 43 mounted in the center of second detecting member 42 varies, and the varying magnetic field is detected by magnetism detecting element 44. Since, at this time, the number of teeth of first detecting member 12 and that of second detecting member 42 are made different from each other, there is produced a difference between the voltage waveforms detected by first detecting unit 19 shown in FIG. 2C and the voltage waveform detected by second detecting unit 49 shown in FIG. 2B, i.e., in the range from the point where rotating member 11 has rotated two rotations leftward and to the point where it has rotated two rotations rightward, from the neutral point, there is produced a slight deviation in the direction of rotation as seen from the voltage waveform of FIG. 2B.

More specifically, a voltage waveform, increasing from voltage value zero to voltage value V and then decreasing, having a longer period than the voltage waveform from first detecting unit 19 is output from second detecting 49 to control unit 20.

Figure 2B:
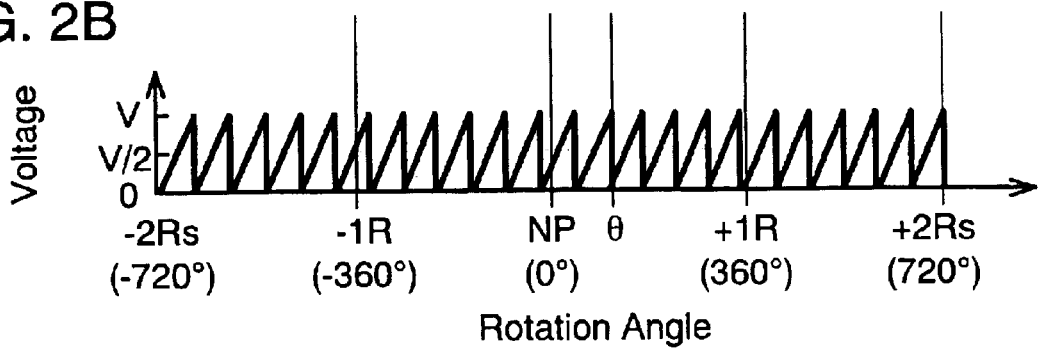
Figure 2C:
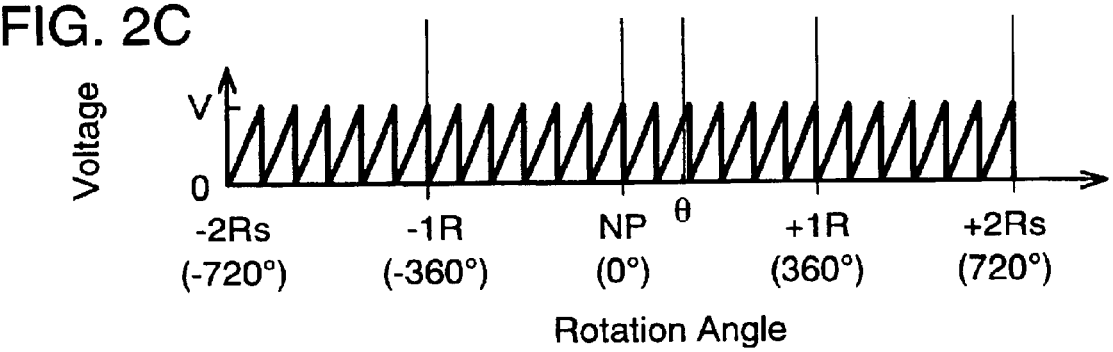

Then, control unit 20, first, deducts the voltage value of the detection signal from second detecting unit 49 shown in FIG. 2B having a longer period from the voltage value of the detection signal from first detecting unit 19 shown in FIG. 2C having a shorter period, to thereby detect the difference between the voltage values.

The difference between the voltage values provides a gradually increasing detection signal as shown in FIG. 2A, namely, the detection signal passes a point of the value 0 as the difference between the voltage value 0 of FIG. 2C and the voltage value 0 of FIG. 2B at the position corresponding to two leftward rotations of rotating member 11, a point of V/2 as the difference between the voltage value V of FIG. 2C and the voltage value V/2 of FIG. 2B at the neutral position, and a point of V as the difference between the voltage value V of FIG. 2C and the voltage value 0 of FIG. 2B at the position corresponding to two rightward rotations of rotating member 11.

Then, control unit 20 detects, based on the voltage difference as the gradually increasing detection signal, an approximate value of the rotation angle, i.e., it detects within what range of the rotation angle in the voltage waveform of FIG. 2C, successively output from first detecting unit 19, the rotation angle is.

For example, when the rotation angle is θ, control unit 20 detects, by reference to the difference between voltage values of FIG. 2A, that the rotation angle corresponds to the second waveform of FIG. 2C counted from the neutral point at an angle of 0°.

In other words, it detects an approximate rotation angle being between 60° and 120°.

It, finally, detects a precise rotation angle of rotating member 11 from the detected voltage waveform.

For example, it detects, from the voltage value of the detected voltage waveform between 60° and 120°, that the precise rotation angle, for example, is 100°.

The waveform of difference between voltage values of FIG. 2A shows a gradually increasing waveform from the rotation angle of rotating member 11 attained by its two leftward rotations to the rotation angle of rotating member 11 attained by its two rightward rotations. Further, the direction of rotation of rotating member 11, i.e., of the SWH, can be detected by control unit 20 according to whether the difference between voltage values has increased or decreased, i.e., it is detected that the direction is toward the right when the difference between voltage values has increased or it is toward the left when the difference between voltage values has decreased.

At the same time, the angles of rotation of the SWH while it is rotated two rotations each to the left and right can be detected.

Since the voltage waveform of FIG. 2C shows a waveform in which the voltage is increasing and decreasing every 60° rotation of rotating member 11, if, for example, a computation is performed in the microcomputer of control unit 20 with use of a 10-bit A/D converter, detection of the rotation angle with as high a resolution as $60°/1024 \approx 0.06°$ (where 1024 is $2^{10}$) can be attained.

According to the present embodiment, a rotation angle detector is arranged such that rotations of the first and second detecting members rotating in association with rotating member 11 rotating in association with SWH are detected as detection signals in which predetermined waveforms continue by first and second detecting units 19, 49, the difference between the waveforms output from first and second detecting units 19, 49 is detected as a gradually increasing detection signal by control unit 20 connected with first and second detecting units 19, 49, and the rotation angle of the rotating member is detected from the two detection signals, i.e., the gradually increasing detection signal and the waveform output from first detecting unit 19. Thus, by having the difference between the above mentioned waveforms detected by control unit 20, an approximate value of the rotation angle is detected and, based on this detected approximate rotation angle, a precise rotation angle is detected from the predetermined waveform output from first detecting unit 19.

Rotating member 11 and detecting members 12, 42 are placed in the same plane. As a result, a RAD capable of angle detection with a high resolution can be provided by a simple structure composed of first and second detecting members 12, 42.

Further, by having first and second detecting units 19, 49 constructed of magnets 13, 43 and magnetism detecting elements 14, 44, the RAD, while it is provided in a simple structure and at a low cost, is enabled to perform noncontact and stable detection.

Figure 3:
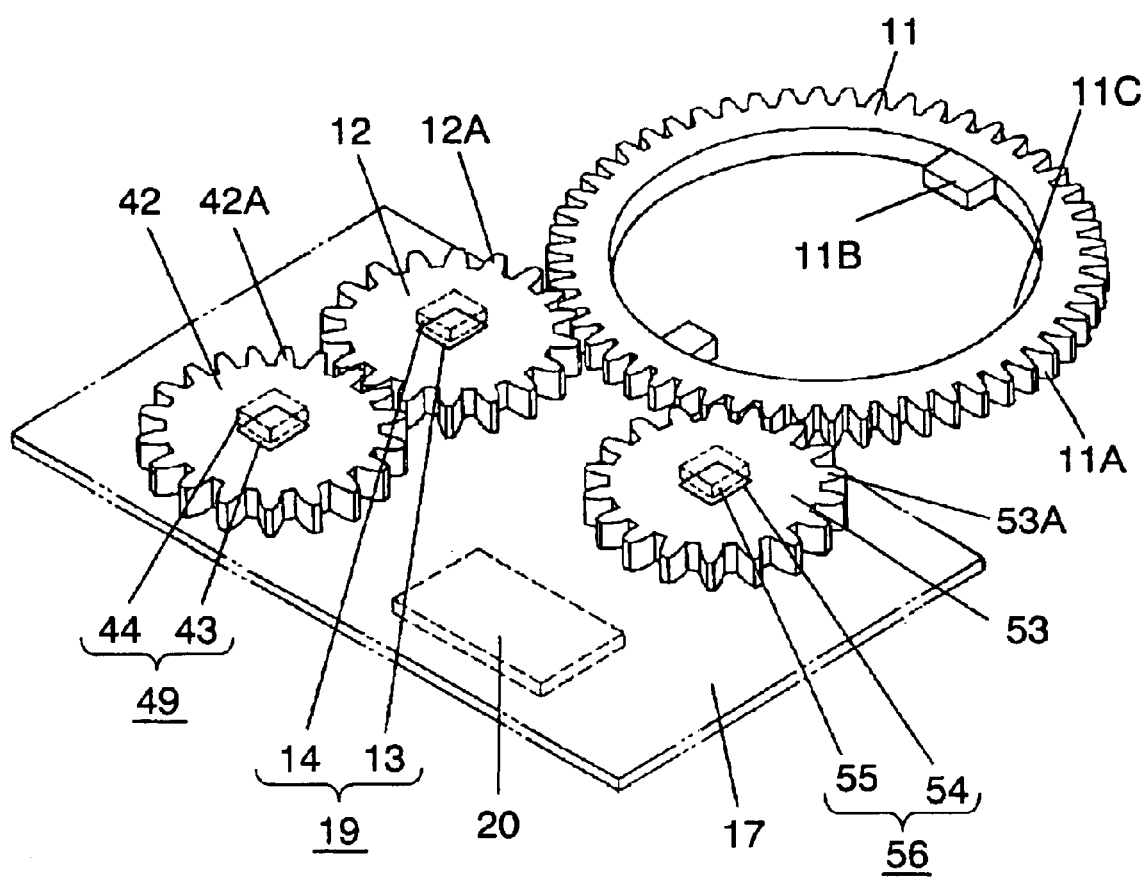
FIG. 3 is a perspective view of an important portion of another rotation angle detector of the embodiment of the present invention.
Figure 4:
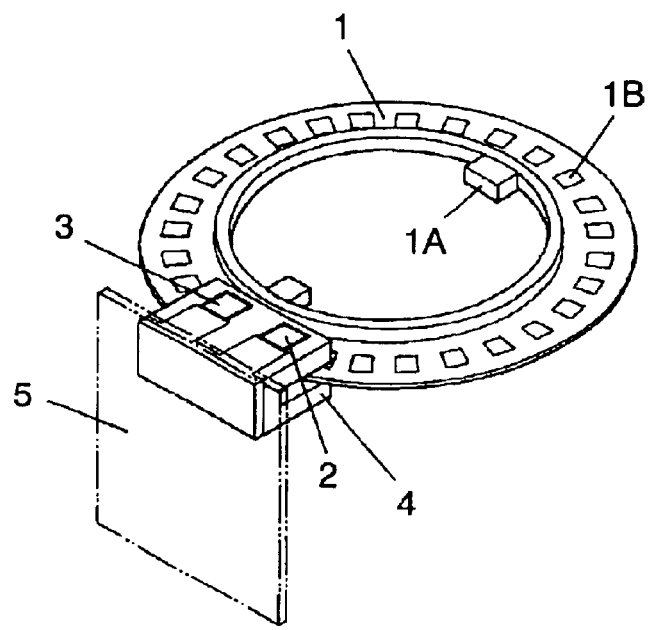
FIG. 4 is a perspective view of an important portion of a prior art rotation angle detector.
Figure 5A:
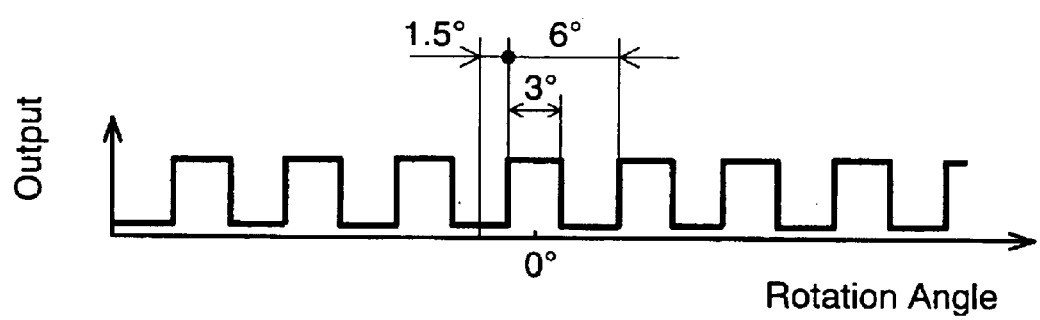
FIG. 5A and FIG. 5B are voltage waveform diagrams output from the prior art rotation angle detector.
Figure 5B:
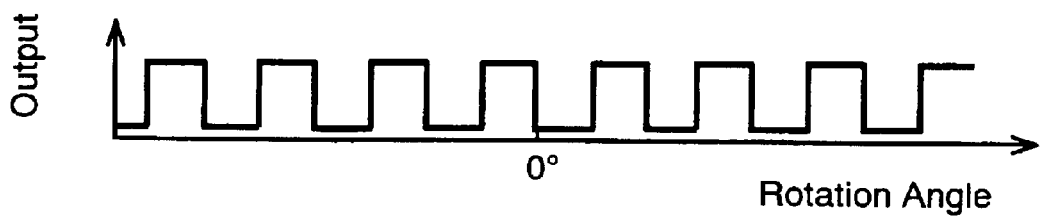

Further, auxiliary detecting unit 56, in addition to first detecting unit 19, may be provided as shown in FIG. 3 by arranging spur gear portion 53A of auxiliary detecting member 53, having the same number of teeth and shape as spur gear portion 12A of first detecting member 12, in meshing engagement with spur gear portion 11A of rotating member 11 and by mounting magnet 54 in the center of auxiliary detecting member 53 and magnetism detecting element 55 of an AMR element or the like on wiring board 17. Thus, by allowing a detection signal from auxiliary detecting unit 56 to be also detected by control unit 20, in a case where, for example, a detection signal is not output from first detecting unit 19 while a detection signal from auxiliary detecting unit 56 is output, it can be known that some trouble has occurred in first detecting unit 19.

In other words, when there is present some difference between waveforms from first detecting unit 19 and auxiliary detecting unit 56, which should essentially be output as the same waveforms, it can be detected that either of the detecting units is out of order. Therefore, more reliable detection of the rotation angle can be attained.

In the foregoing, there has been described such an arrangement in which spur gear portion 12A of first detecting member 12 is disposed in meshing engagement with spur gear portion 11A on the circumferential side of rotating member 11 and spur gear portion 42A of second detecting member 42 is disposed in meshing engagement with spur gear portion 12A. Also, it is possible to use other types of gears, such as bevel gears, instead of spur gear portions 11A, 12A, 42A, 53A, or to use other elements than gear wheels that are in projected shapes and depressed shapes and can be engaged with each other.

In the description given above, the difference between waveforms output from first and second detecting units 19, 49 has been described as a gradually increasing detection signal obtained by deducting the voltage value of the detection signal having a longer period output from second detecting unit 49 from the voltage value of the detection signal having a shorter period output from first detecting unit 19. It may also be arranged to detect a gradually decreasing detection signal by deducting the voltage value of the detection signal having a shorter period output from first detecting unit 19 from the voltage value of the detection signal having a longer period output from second detecting unit 49.

Further, even if the precise rotation angle of rotating member 11 is detected based on the detection signal having a longer period output from second detecting unit 49, detection of rotation angle with a high resolution can be obtained though the resolution in this case may be slightly deteriorated from that obtained when the rotation angle is detected based on the detection signal having a shorter period output from first detecting unit 19.

According to the present invention, as described in the foregoing, a RAD capable of angle detection at a high resolution can be provided by a simple configuration.

What is claimed is:

1. A rotation angle detector comprising:
   a rotating member;
   first and second detecting members rotating in association with the rotating member;
   a first detecting unit for detecting a rotation of the first detecting member as a detection signal in which a predetermined waveform continues;
   a second detecting unit for detecting a rotation of the second detecting member as a detection signal in which a predetermined waveform different in period from the first detection signal continues; and
   a control unit connected with the first and second detecting unit, wherein
   the control unit detects a difference between waveforms output from the
   first and second detecting units as a gradually increasing or decreasing detection signal, and
   the control unit detects a rotation angle of the rotating member by using two signals, of which one is the gradually increasing or decreasing signal and the other is one of the waveforms output from the first and second detecting units.

2. The rotation angle detector according to claim 1, wherein
   the first and second detecting units are each formed of a magnet and a magnetism detecting element.

3. The rotation angle detector according to claim 2, wherein
   the magnetism detecting element is a magnetoresistance element.

4. The rotation angle detector according to claim 1, wherein
   the rotating member has an opening through which a shaft of a steering wheel is inserted.

* * * * *

UNITED STATES PATENT AND TRADEMARK OFFICE
CERTIFICATE OF CORRECTION

PATENT NO. : 6,861,837 B1
DATED : March 1, 2005
INVENTOR(S) : Masaru Shimizu et al.

It is certified that error appears in the above-identified patent and that said Letters Patent is hereby corrected as shown below:

Title page,
Item [56], References Cited, U.S. PATENT DOCUMENTS, "Skirai et al." should read
-- Shirai et al. --.

Signed and Sealed this

Twenty-second Day of November, 2005

JON W. DUDAS
*Director of the United States Patent and Trademark Office*